United States Patent
Martin (10) Patent No.: US 7,090,457 B2
(45) Date of Patent: Aug. 15, 2006

(54) PORTABLE LIFT FOR INSTALLING AND UNINSTALLING COMPUTER-RELATED EQUIPMENT INTO A STORAGE CABINET

(75) Inventor: Tony Martin, Independence, MO (US)

(73) Assignee: Celeritas Technologies, Overland Park, KS (US)

( * ) Notice: Subject to any disclaimer, the term of this patent is extended or adjusted under 35 U.S.C. 154(b) by 114 days.

(21) Appl. No.: 10/391,375

(22) Filed: Mar. 18, 2003

(65) Prior Publication Data

US 2003/0228207 A1  Dec. 11, 2003

Related U.S. Application Data

(60) Provisional application No. 60/386,767, filed on Jun. 7, 2002.

(51) Int. Cl.
 *B67F 7/02*  (2006.01)
(52) U.S. Cl. .............. 414/277; 187/241; 187/243; 414/401; 414/659
(58) Field of Classification Search ........ 187/241–243, 187/225, 235; 414/277, 280, 401, 608, 659, 414/661
See application file for complete search history.

(56) References Cited

U.S. PATENT DOCUMENTS

| | | | |
|---|---|---|---|
| 1,105,956 A * | 8/1914 | Boehck ............... | 187/225 |
| 1,381,552 A * | 6/1921 | Hescock .............. | 187/225 |
| 1,676,449 A * | 7/1928 | Lederer ............... | 187/266 |
| 3,964,573 A * | 6/1976 | Wilson ............... | 182/116 |
| 4,265,583 A * | 5/1981 | Baird et al. ......... | 414/284 |
| 4,269,285 A * | 5/1981 | Ohkoshi et al. ..... | 187/270 |
| 4,702,663 A * | 10/1987 | Mischke et al. ..... | 414/618 |
| 4,817,070 A * | 3/1989 | Hug et al. .......... | 369/30.39 |
| 5,056,672 A | 10/1991 | Yamada | |
| 5,083,893 A * | 1/1992 | Yang .................. | 414/595 |
| 5,322,403 A * | 6/1994 | Herde ................ | 414/11 |
| 5,452,951 A | 9/1995 | Peller | |
| D370,758 S | 6/1996 | McCanse | |
| 5,571,256 A | 11/1996 | Good et al. | |
| 5,683,001 A | 11/1997 | Masuda et al. | |
| 5,798,485 A | 8/1998 | Rohde et al. | |
| 6,021,047 A | 2/2000 | Lopez et al. | |
| 6,181,549 B1 | 1/2001 | Mills et al. | |
| 6,301,837 B1 | 10/2001 | Ray | |
| 2003/0221914 A1* | 12/2003 | Smith et al. ......... | 187/244 |

FOREIGN PATENT DOCUMENTS

| | | | |
|---|---|---|---|
| JP | 4-304103 | * | 10/1992 |
| JP | 4-364310 | * | 12/1992 |
| JP | 8-9519 | * | 1/1996 |
| JP | 8-163722 | * | 6/1996 |
| JP | 8-331713 | * | 12/1996 |
| JP | 1066626 | | 3/1998 |

* cited by examiner

*Primary Examiner*—Thomas J Brahan
(74) *Attorney, Agent, or Firm*—Hovey Williams LLP (57) ABSTRACT

A portable lift (10) for installing and uninstalling computer-related equipment (12) into a storage cabinet (14) broadly comprises a frame (16) operable to be removably secured to the storage cabinet (14); a trolley (18) for supporting the computer-related equipment (12); and a winch assembly (20). The frame (16) is operable to fold into a plurality of portions (28,30,32) for easy storage within a carrying unit (22). The trolley (18) includes a tray (126) on which the computer-related equipment (12) may be placed. The winch assembly (20) includes a winch (166), a plurality of pulleys (168,170,172), and a plurality of cable portions (180,182, 184) that in operation are operable to vertically move the tray (126) within the frame (16) for positioning of the equipment (12) in the storage cabinet (14). The portable lift (10) is lightweight, easy-to-use, and may be assembled and disassembled by one user.

11 Claims, 10 Drawing Sheets

PORTABLE LIFT FOR INSTALLING AND UNINSTALLING COMPUTER-RELATED EQUIPMENT INTO A STORAGE CABINET

RELATED APPLICATIONS

The present application claims priority benefit of and hereby incorporates by reference a provisional application titled "PORTABLE LIFT", Ser. No. 60/386,767, filed Jun. 7, 2002.

BACKGROUND OF THE INVENTION

1. Field of the Invention

The present invention relates to lifts for installing and uninstalling computer-related equipment, such as computer servers, into storage cabinets. More particularly, the invention relates to a light, easy-to-use portable lift designed to be used by one person for installing and uninstalling such equipment.

2. Description of the Prior Art

A significant amount of computer-related equipment is stored in storage cabinets or racks to better utilize floor space. Such equipment can weigh over 136 kg (approximately 300 lbs) and be placed at the top of a storage cabinet having a height in excess of 2.5 meters (approximately 8.2 feet). The most commonly used method of installing the equipment into the storage cabinet is to have a first person lift and hold the equipment in place while a second person secures the equipment within the cabinet. A significant disadvantage of this method is that it can lead to personal injury and/or damage to the equipment. This is especially true with heavier equipment installed at higher heights.

To remedy some of the above disadvantages, general purpose lifting devices are sometimes used to lift computer-related equipment for placement into storage cabinets. Unfortunately, most of these devices are not designed for installing or uninstalling computer-related equipment, and thus, are difficult to use. Additionally, many of these devices are extremely heavy and bulky and are thus required to be transported by truck, necessitating at least two people to load/unload the device from the truck. Large devices are necessary, however, so that the device can safely support and lift the equipment while the device is in a freestanding configuration. Furthermore, such prior art devices are also expensive. Due to the above disadvantages, many companies do not invest the money to purchase a proper lift, or the personnel performing the installation avoid using the equipment altogether.

Accordingly, there is a need for an improved lift that overcomes the limitations of the prior art. More particularly, there is a need for a portable lift that is lightweight, easy-to-use, and designed to accommodate and support weight loads in excess of 136 kg (approximately 300 lbs).

SUMMARY OF THE INVENTION

The present invention solves the above-described problems and provides a distinct advance in the art of lifts. More particularly, the present invention provides a lightweight, collapsible, and portable lift that may be secured to any brand storage cabinet for facilitating installation and removal of computer-related equipment.

The portable lift of the present invention broadly includes a frame, a trolley, and a winch assembly. The frame has first and second ends and is divided into first, second, and third folding portions, wherein the first portion is operable to fold proximal to the second portion, and the first and second portions are operable to fold proximal to the third portion. The frame includes first and second vertical frame members, a horizontal frame member, a base, and four securing arms. The vertical frame members are substantially parallel and spaced a distance apart. The horizontal frame member is positioned at the first end of the frame and between the first and second vertical frame members. The base is positioned at the second end of the frame and is operable to stabilize and support the portable lift. The four securing arms are rotatingly secured to the vertical frame members and are operable to be removably secured to the storage cabinet. Once the securing arms are secured to the storage cabinet, the portable lift is stable and operable to support the weight of the computer-related equipment. Once disassembled, the portable lift is designed to store within a carrying unit for increased portability.

The trolley is operable to mounted to the frame and includes first and second support brackets and a tray. The support brackets are operable to be secured to the frame. Each support brackets includes two U-shaped guides formed at either end of the bracket. The tray includes a plurality of castors secured to an underside of the tray for moving the tray to a desired position.

The winch assembly includes a winch, first, second, and third pulleys, first and second guide rollers, a cable connector, and first, second, and third cable portions. The winch is preferably secured to the first vertical frame member of the frame. The first pulley is positioned on the first vertical frame member at the second end of the frame. The second pulley is positioned on the first vertical frame member at the first end of the frame, and the third pulley is positioned on the second vertical frame member at the first end of the frame. The guide rollers each include two rollers operable to roll along the first and second vertical frame members, respectively. A first end of the first cable portion is secured to the winch, and a second end of the first cable portion is secured to the cable connector. The first cable portion is operable to wind around the first pulley. The second and third cable portions are secured to the cable connector, and the second cable portion winds around the second pulley and is secured to the first guide roller. The third cable portion winds around the second pulley, proceeds along the horizontal frame member, winds around the third pulley, and is secured to the second guide roller.

In operation, the computer-related equipment is placed on the tray of the trolley, the tray is supported by and secured within the U-shaped guides of the support brackets of the trolley, and the trolley is removably mounted to the guide rollers. A user of the portable lift winds the winch, which moves the trolley upwards via the first, second, and third pulleys and the first, second and third cable portions. Once at the desired height, the computer-related equipment is loaded into the storage cabinet.

By constructing a portable lift as described herein, numerous advantages are realized. For example, the portable lift is stable and is operable to support and lift loads in excess of 136 kg (approximately 300 lbs). Additionally, the portable lift is lightweight and is operable to be folded and stored within the carrying unit, thus requiring only one user to carry, assemble, and disassemble the lift. Furthermore, the lift can be used with any brand of storage cabinet. Further yet, the lift is inexpensive to manufacture and is easy-to-use.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 1:
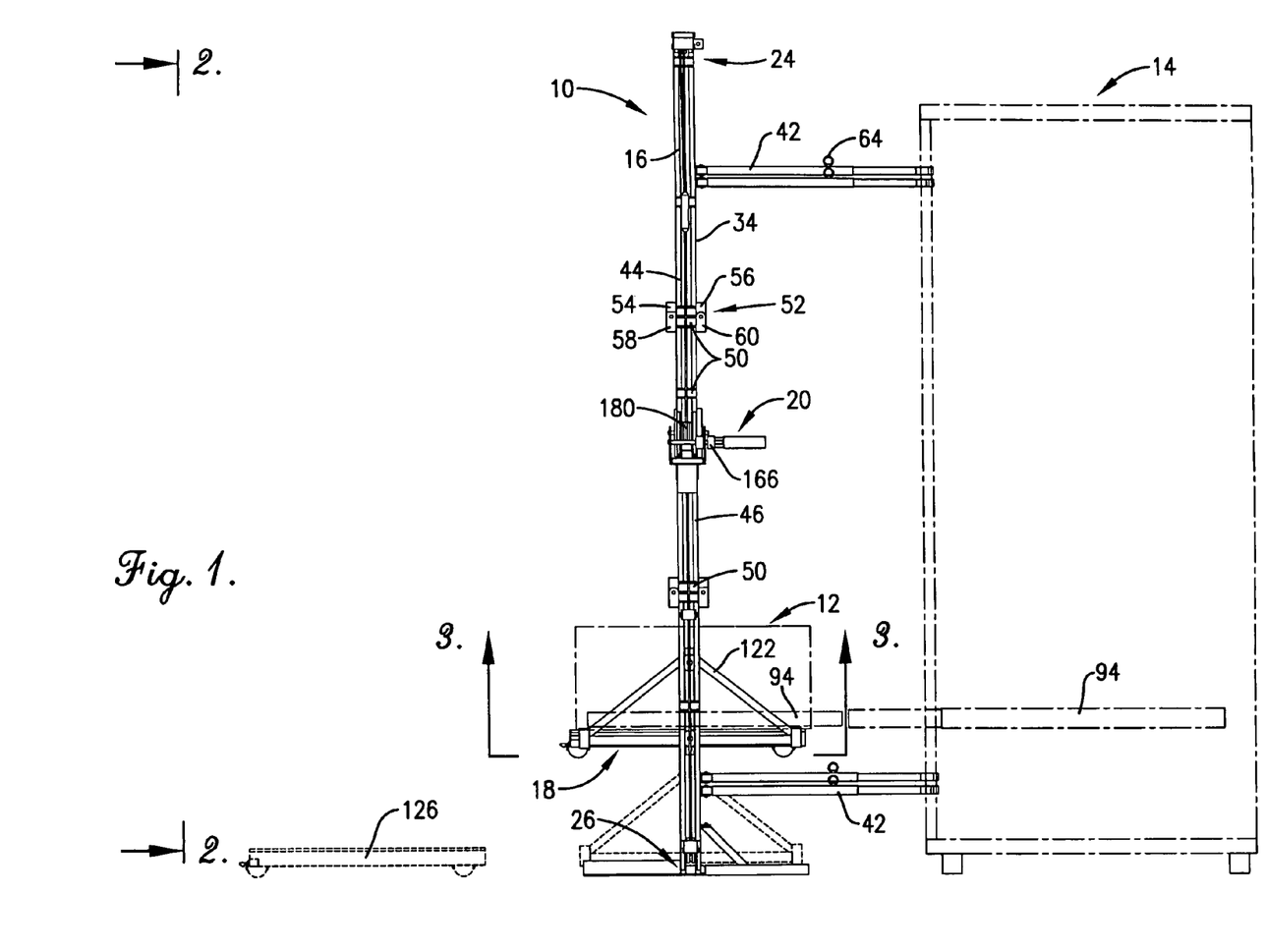
FIG. 1 is a side elevational view of a portable lift constructed in accordance with a preferred embodiment of the present invention showing computer-related equipment placed on the portable lift's tray and a trolley, including the tray, raised into position for storage of the computer-related equipment in a storage cabinet.
Figure 2:
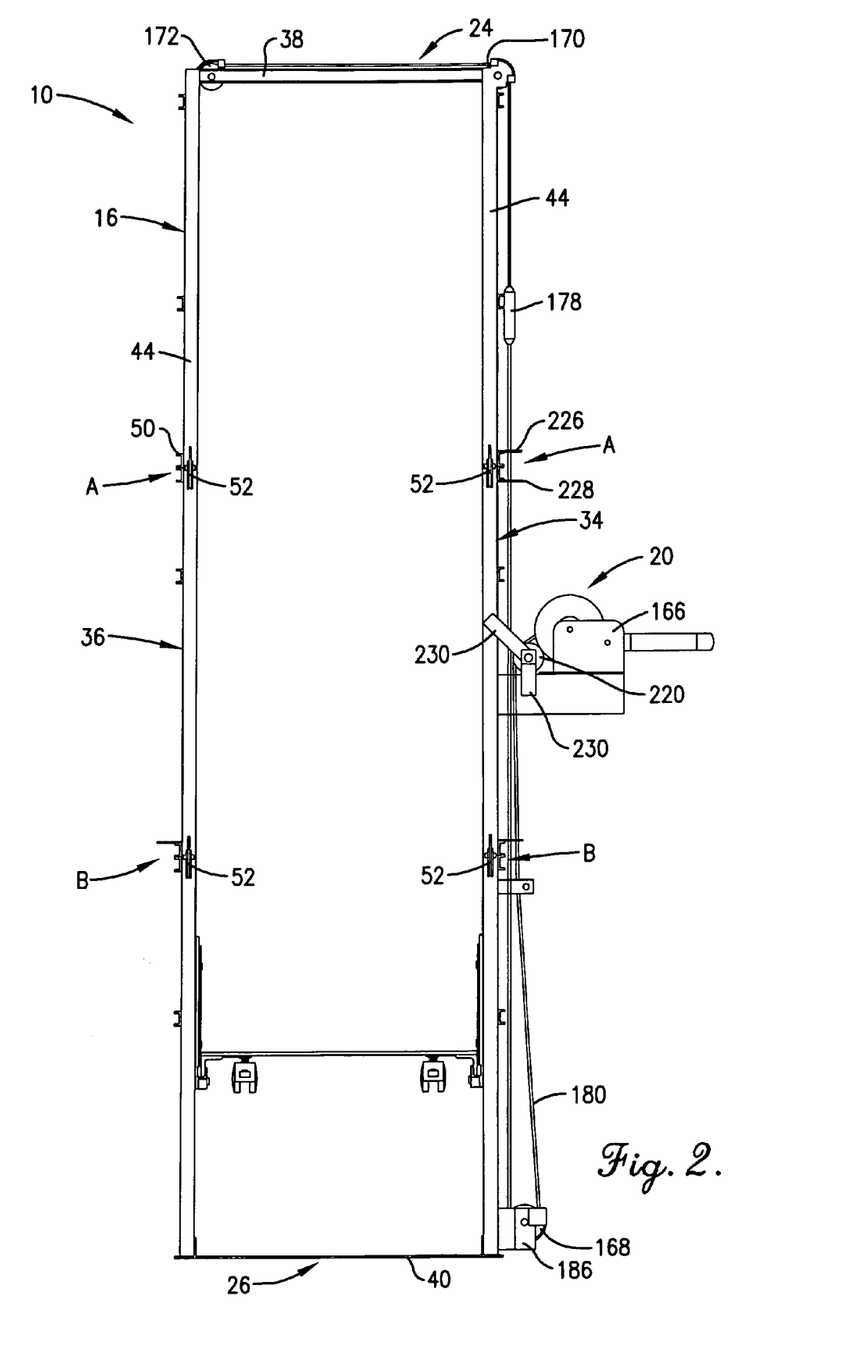
FIG. 2 is a front elevational view of the portable lift taken through line 2—2 of FIG. 1, illustrating a frame of the portable lift, the trolley raised within the frame, and a winch assembly of the portable lift for raising and lowering the trolley.
Figure 14:
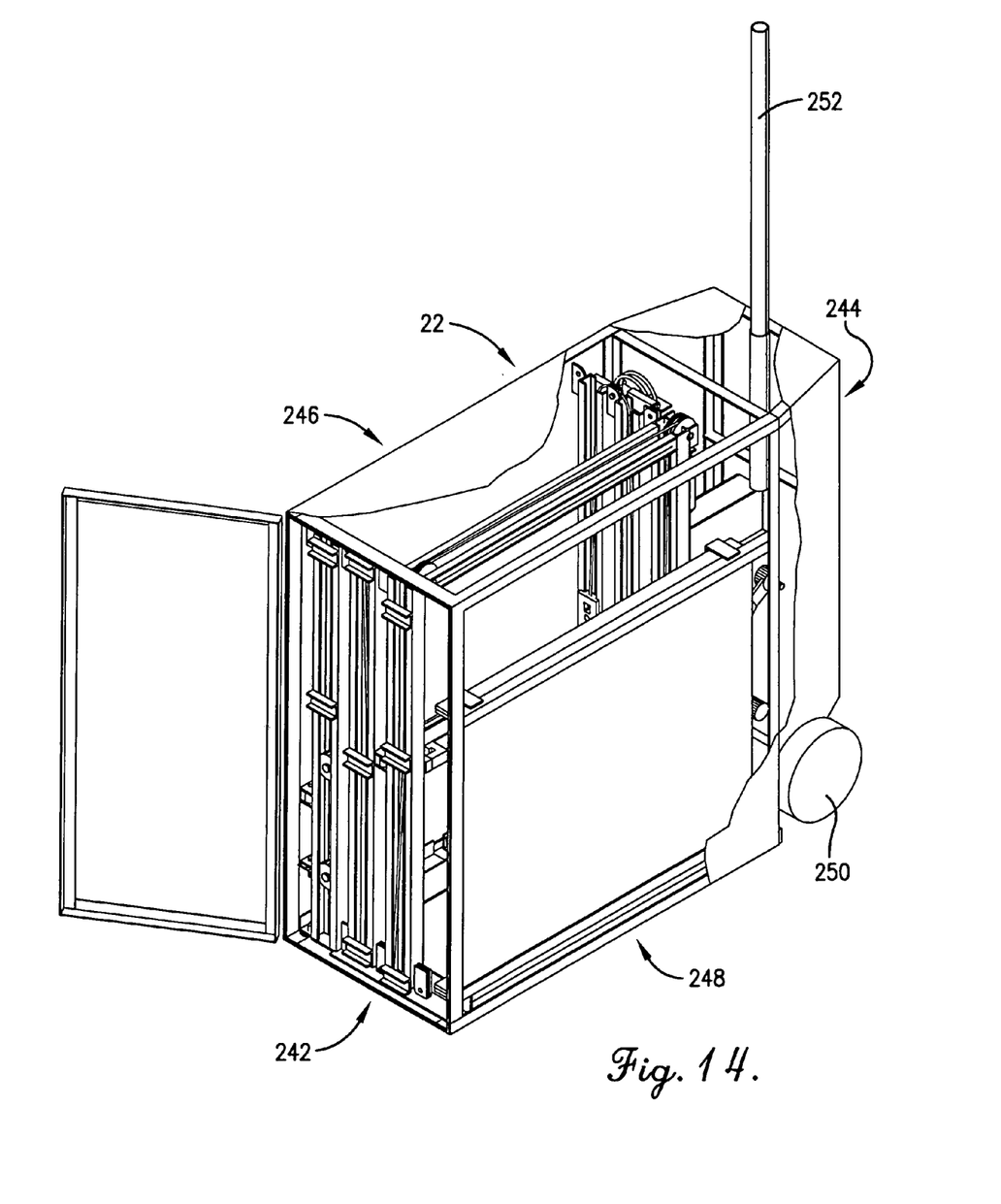
FIG. 14 is a partial sectional isometric view of a carrying unit for storing and carrying the portable lift, illustrating the lift disassembled and folded within the carrying unit.

Turning now to the drawing figures, and particularly FIGS. 1 and 2, a portable lift 10 constructed in accordance with a preferred embodiment of the invention is illustrated. The portable lift 10 is provided for installing and uninstalling computer-related equipment 12 into a storage cabinet 14 and broadly includes a frame 16; a trolley 18 removably mounted to the frame 16; and a winch assembly 20 for moving the trolley 18. The portable lift 10 is uniquely designed to be easily disassembled such that the lift 10 may be stored in a carrying unit 22, as illustrated in FIG. 14 and as described in more detail below.

Figures 10, 11:
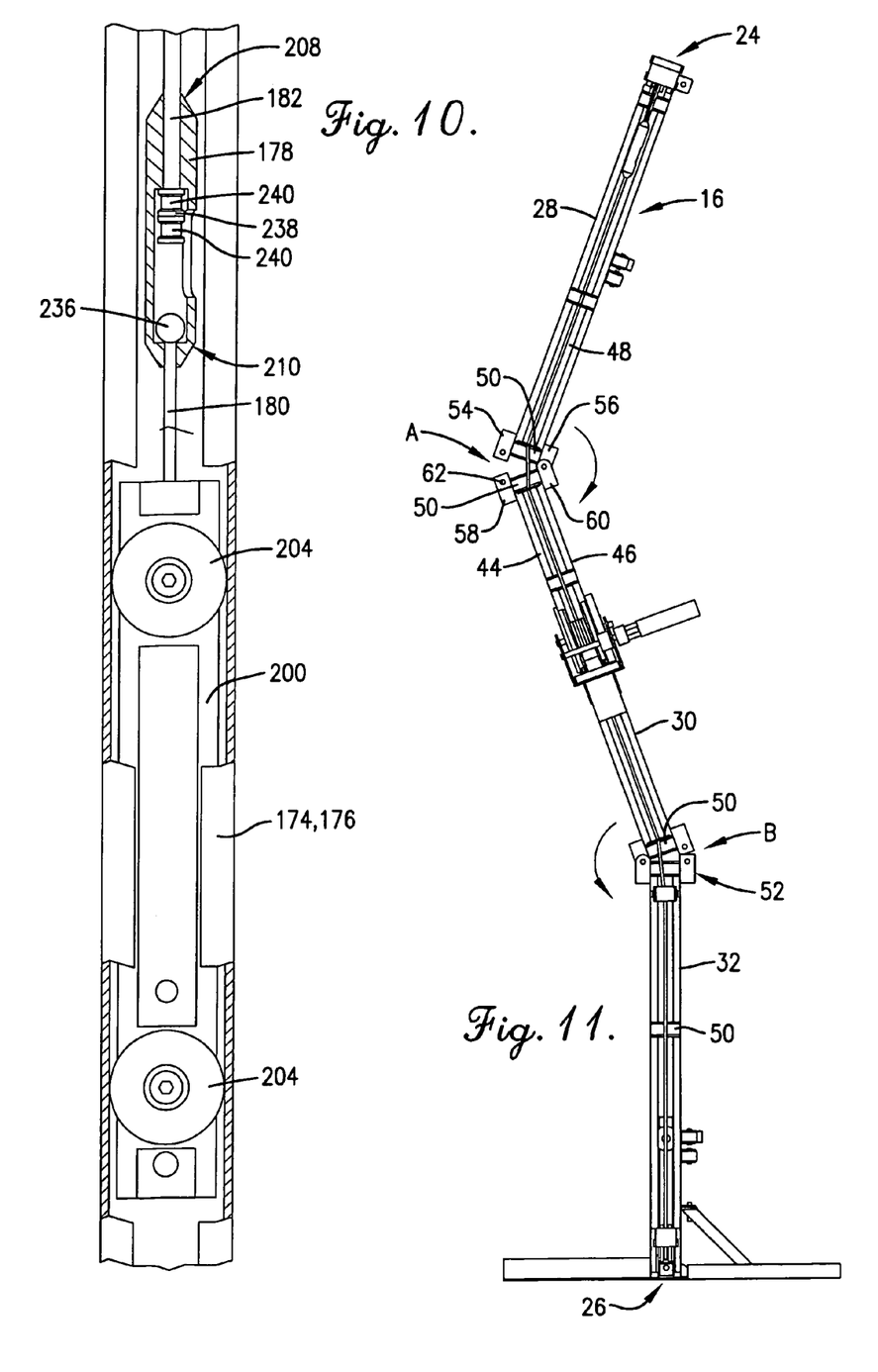
FIG. 10 is a fragmentary front elevational view of the guide roller and the cable connector.
FIG. 11 is a side elevational view of the portable lift, illustrating the frame divided into the plurality of portions and the folding of the frame for disassembly of the portable lift.

The frame 16 of the portable lift 10 has first and second ends 24,26 and is preferably divided into first, second, and third folding portions 28,30,32, wherein the first portion 28 is operable to fold proximal to the second portion 30, and the first and second portions are operable to fold proximal to the third portion 32, as illustrated in FIG. 11. Alternatively, the frame 16 may include less or more folding portions, depending on the size and use requirements of the portable lift 10. The folding ability of the frame 16 facilitates the storage and portability of the present invention, as discussed in more detail below.

The frame 16 also preferably includes first and second vertical frame members 34,36, a horizontal frame member 38, a base 40, and four securing arms 42. The frame 16 is preferably made of steel, but other suitable materials may be used, such as aluminum, other alloys, or composites. Once assembled, the frame 16 preferably has a height of approximately 2.2 meters (approximately 7 feet), but the height may range between 1 meter (approximately 3.3 feet) and 3 meters (approximately 9.8 feet). The frame 16 also preferably has a width of approximately 0.6 meters (approximately 1.9 feet), but the width may range between 0.3 meters (approximately 1 foot) and 1.27 meters (approximately 4.2 feet), and a depth or length of approximately 0.6 meters (approximately 1.9 feet), but the depth may range between 0.3 meters (approximately 1 foot) and 1.27 meters (approximately 4.2 feet).

Figure 6:
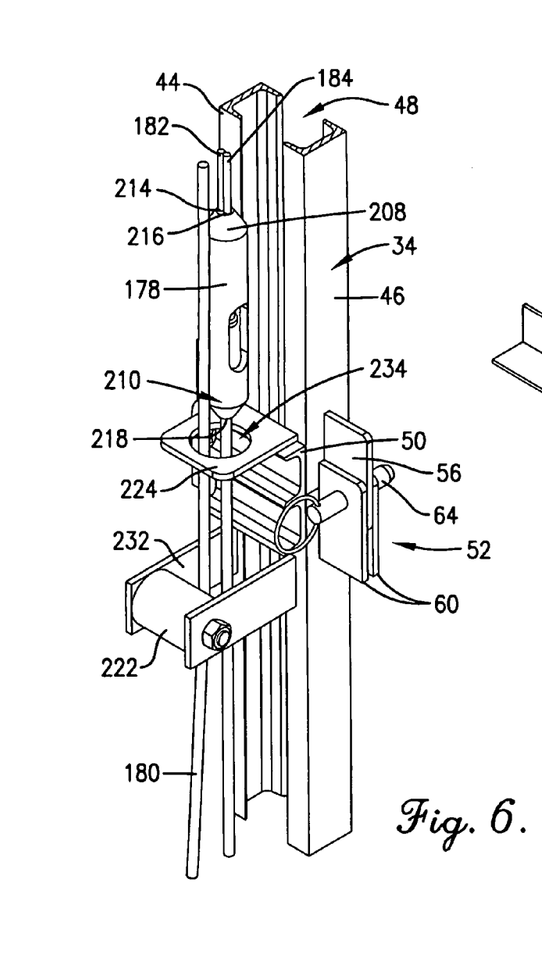
FIG. 6 is an isometric view of the frame, illustrating a cable connector of the winch assembly, a ring extension secured to the frame for orienting and guiding cable portions, and a hinge secured to the frame that allows for folding of the frame into a plurality of portions.

As illustrated in FIG. 6, the first and second vertical frame members 34,36 each preferably include first and second individual members 44,46 secured together so as to form an open channel 48, the purpose of which will be described below. The open channel 48 preferably has a width of approximately 5.1 centimeters (approximately 2 inches), although the width may range between 1.27 centimeters (approximately 0.5 inch) and 25.4 centimeters (approximately 10 inches). The first and second individual members 44,46 of each vertical frame member 34,36 are secured together by welding a plurality of bridges 50 between the individual members 44,46 at various positions along the vertical frame members 34,36. Alternatively, the bridges 50 may be secured to each individual member 44,46 using screws or other securing methods.

As noted above, the frame 16 is operable to fold into three separate portions 28,30,32. As such, the vertical frame members 34,36 are hinged at two locations, marked A and B, on FIG. 2. At each location, A and B, the vertical frame members 34,36 are completely separated. At location A, for example, a hinge 52 connects the severed first and second portions 28,30 of the first vertical frame member 34, as illustrated in FIG. 11. The hinge 52 includes first and second generally rectangularly-shaped extensions 54,56 welded or otherwise secured to the first portion 28 of the frame 16. The hinge 52 also include two pairs of generally rectangularly-shaped extensions (pair not shown), hereinafter referred to as third and fourth extensions 58,60, secured to the second portion 30 of the frame 16 and proximate to the first portion 28 of the frame 16. The first and third extensions 54,58 are positioned generally transverse to the first individual member 44, and the second and fourth extensions 56,60 are positioned generally transverse to the second individual member, as illustrated in FIG. 1.

Each of the four extensions 54,56,58,60 are provided with an opening 62, such that the openings 62 in the first and third extensions 54,58 are aligned and the openings 62 in the second and fourth extensions 56,60 are aligned when the portable lift 10 is assembled. The first and second portions 28,30 of the frame 16 are secured together by inserting a rotatable screw (not shown) through the aligned openings 62 formed in the second and fourth extensions 56,60 on the second individual member 46. As such, the first portion 28 of the frame 16 is operable to rotate and fold against the second portion 30, as noted above. To further secure and stabilize the first and second portions 28,30 of the frame, a locking pin 64 is inserted through the aligned openings 62 of the first and third extensions 54,58 on the first individual member 44, as illustrated in FIG. 6. The locking pin 64 is operable to easily slide in and out of the aligned openings 62 of the first and third extensions 54,58 and be removed for disassembly the portable lift 10.

Since there are two vertical frame members 34,36 preferably divided into three portions 28,30,32, there is a total of four hinges 52, i.e. the hinge 52 discussed above and three other substantially similar hinges 52, also referred to in FIGS. 2 and 11 as number 52. The above description of the positioning of the hinge 52 on the first vertical frame member 34 is by way of example only. The positioning of the other remaining hinges 52 will vary, depending on the direction the frame 16 is folding, although operation of the remaining hinges 52 is substantially similar to the hinge 52 positioned at location A.

To provide further support, alignment, and weight-bearing capabilities to the portable lift 10, two bridges 50, substantially similar to the bridges 50 described above, are welded or otherwise secured to the frame 16 and between the first 54 and third 58 and second 56 and fourth 60 extensions of each hinge 52, such that the bridges 50 substantially contact each other when the portable lift 10 is assembled and the frame portions 28,30,32 are aligned, as illustrated in FIGS. 1 and 2. An end 66 of each bridge 50 is machined substantially flat, as illustrated in FIG. 6, which produces a larger surface area to compensate for any heat expansion of the frame 16. Additionally, since the bridges 50 substantially contact each other when the lift 10 is assembled, a portion of the weight of the computer-related equipment 12 being lifted by the lift 10 is transferred from the vertical frame members 34,36 to the bridges 50. The positioning of the bridges 50 in close proximity to each other also facilitates alignment of the frame 16 when assembling the portable lift 10.

Figure 9:
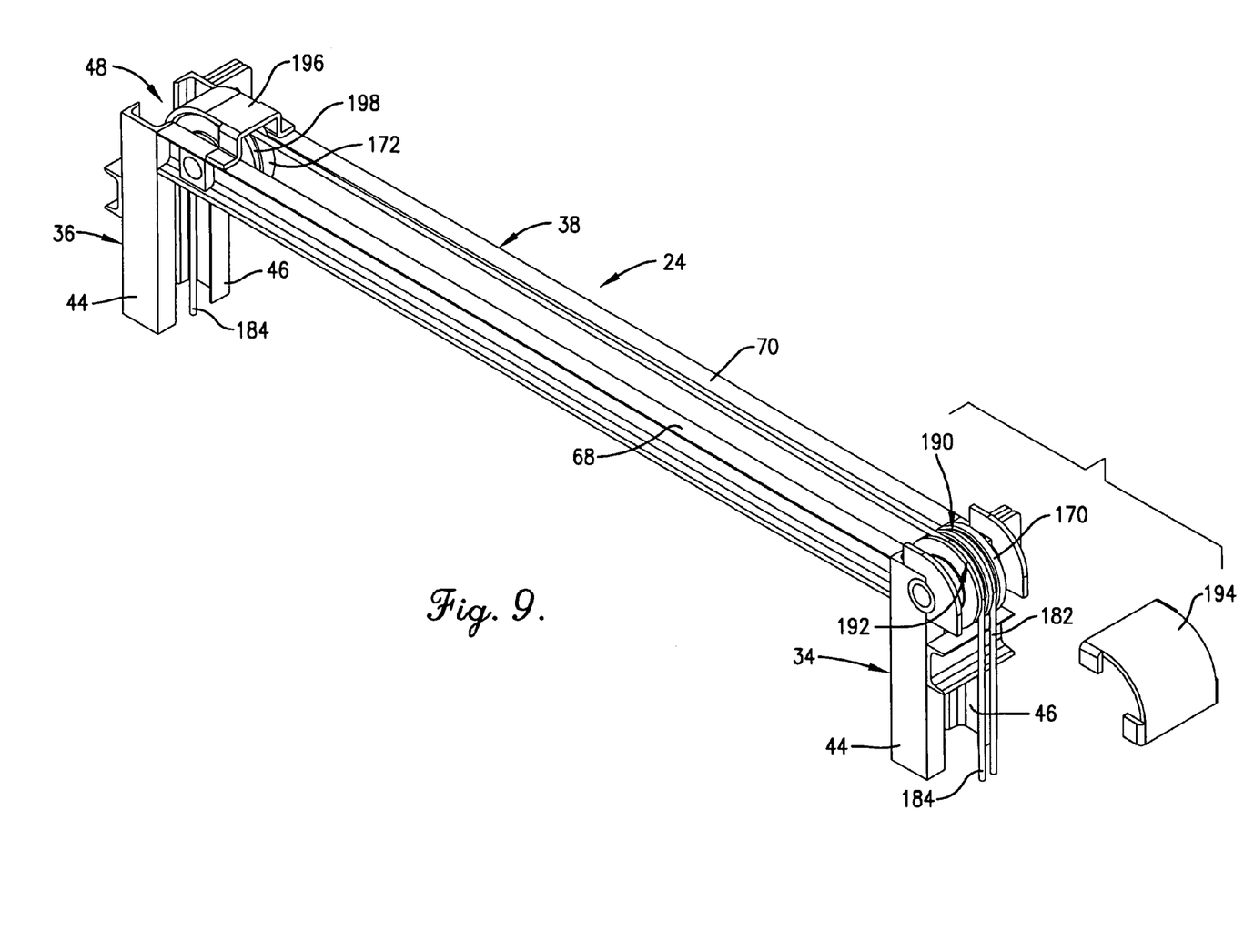
FIG. 9 is an exploded isometric view of a first end of the frame, illustrating second and third pulleys and a first pulley cover.

The horizontal frame member 38 is preferably positioned at the first end 24 of the frame 16 between the first and second vertical frame members 34,36, as illustrated in FIG. 9. The horizontal frame member 38 includes first and second substantially parallel members 68,70 spaced apart approximately the width of the open channel 48, such that the first parallel member 68 is secured to the first individual member 44 of both the first and second vertical frame members 34,36, and similarly, the second parallel member 70 is secured to the second individual member 46 of both the first and second vertical frame members 34,36.

Figures 4, 5:
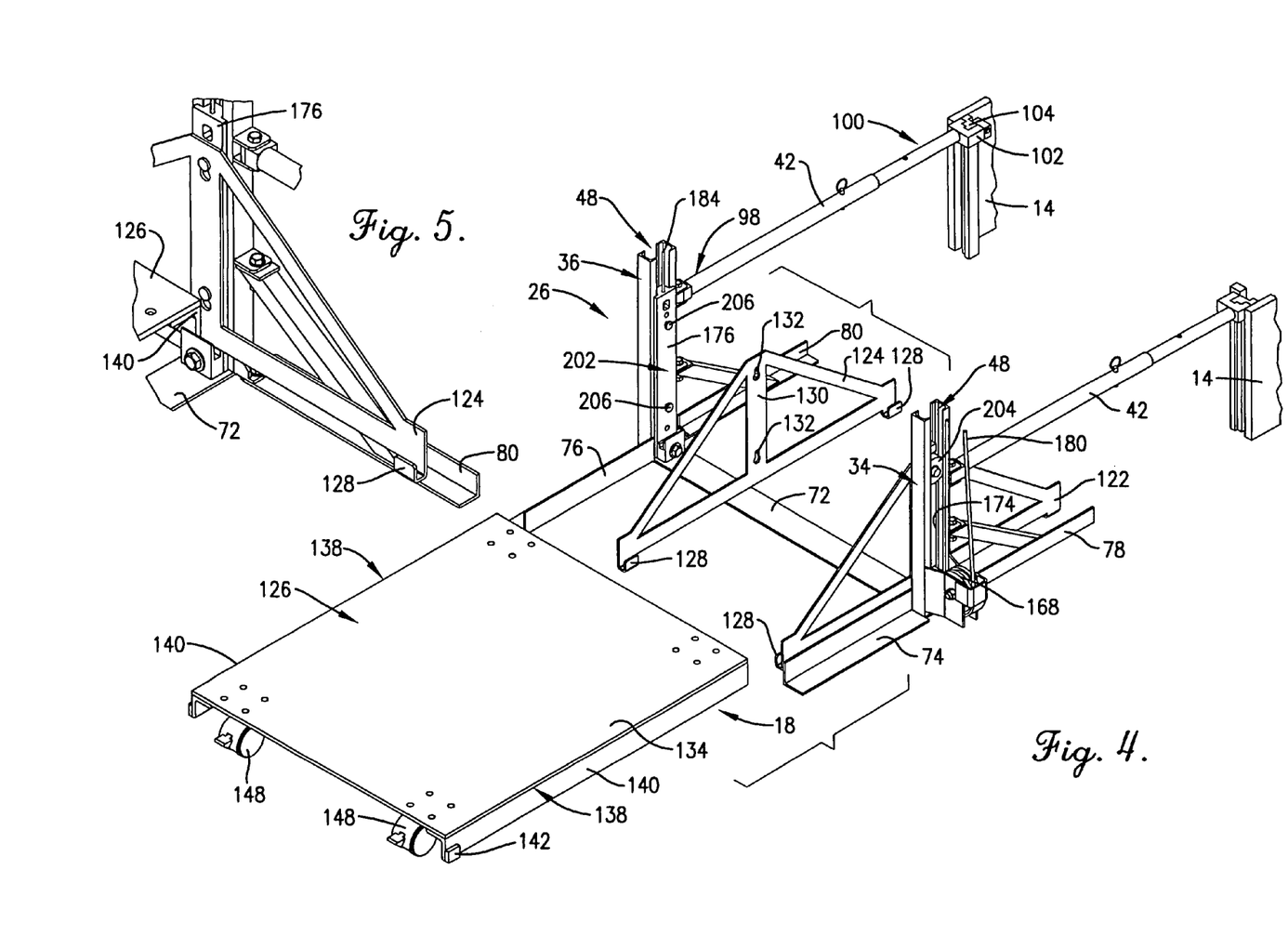
FIG. 4 is a partially exploded isometric view of a second end of the frame, illustrating securing arms of the lift secured to a flange of the storage cabinet, the tray operable to be secured within the support brackets, and the mounting of the support brackets on the frame of the portable lift.
FIG. 5 is an isometric view of the second end of the frame, illustrating the tray being guided and secured within the support brackets and a guide roller.
Figure 8:
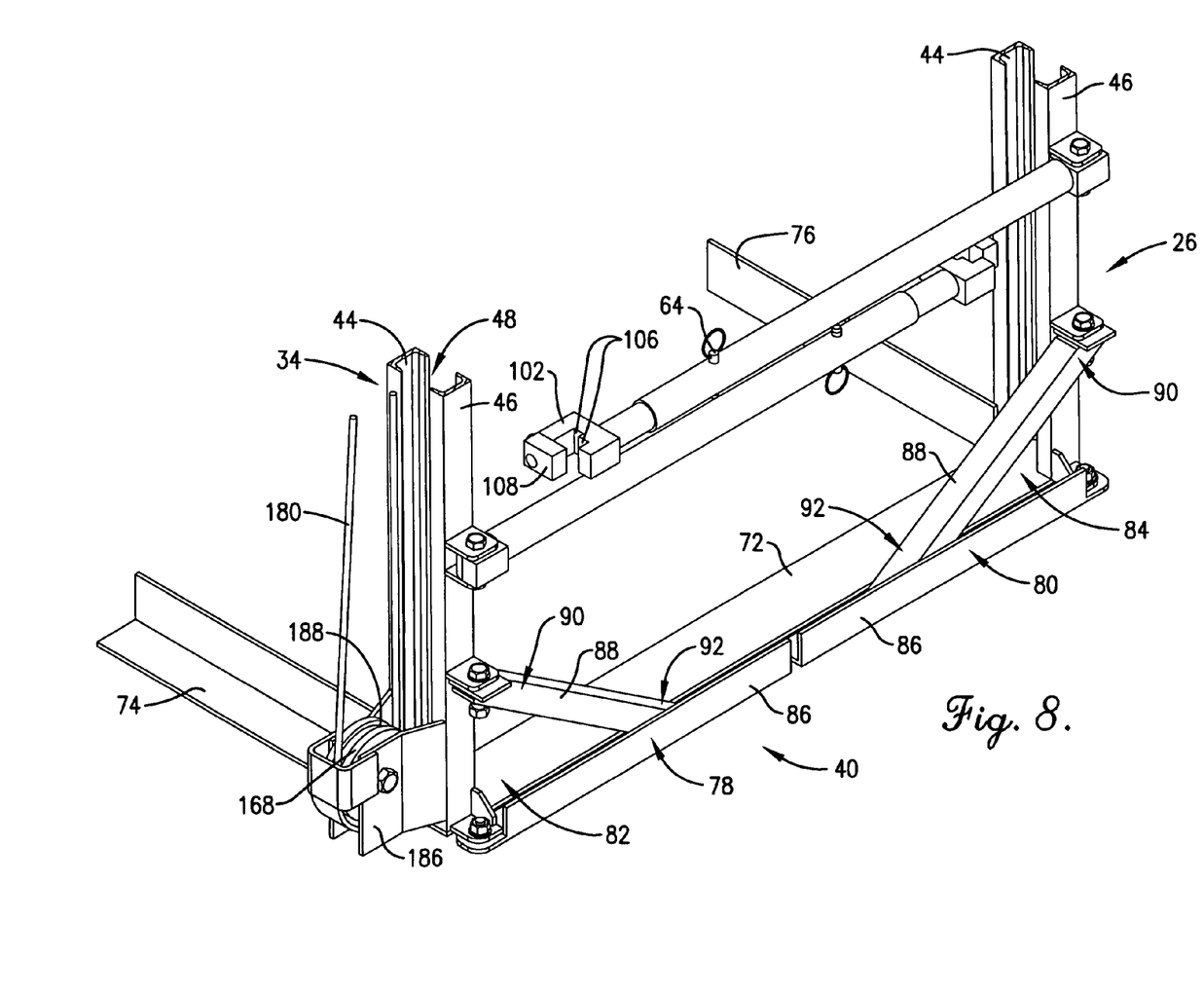
FIG. 8 is an isometric view of the second end of the frame, particularly illustrating a first pulley, a base of the frame, and the securing arms of the frame rotated inwards.

The base 40 of the frame 16 is preferably positioned at the second end 26 of the frame 16 and includes a horizontal base member 72, first and second stationary base members 74,76, and first and second rotating stabilizers 78,80, as illustrated in FIGS. 4 and 8. The horizontal base member 72 has first and second ends 82,84 and is preferably substantially flat so that upon assembly of the portable lift 10, the horizontal base member 72 is in substantial contact with the floor. The horizontal base member 72 is preferably positioned generally parallel to the horizontal frame member 38.

The first and second stationary base members 74,76 have a generally cross-sectional L-shape. The first stationary base member 74 is positioned at the first end 82 of and generally perpendicular to the horizontal base member 72. Similarly, the second stationary base member 76 is positioned at the second end 84 of and generally perpendicular to the horizontal base member 72, as best illustrated in FIG. 8. The first stationary base member 74 is preferably welded or otherwise secured to the first individual member 44 of the first vertical frame member 34. Similarly, the second stationary base member 76 is preferably welded or otherwise secured to the first individual member 44 of the second vertical frame member 36. In use, the first and second stationary base members 74,76 are preferably in substantial contact with the floor for providing support to the lift 10.

The first and second rotating stabilizers 78,80 each preferably include a first segment 86 that has a generally cross-sectional L-shape and a second segment 88 positioned diagonally with respect to the first segment 86, whereby the second segment 88 has first and second ends 90,92. A length of the first segment 86 is preferably approximately one-half the width of the frame 16 such that each rotating stabilizer 78,80 may rotate to fold proximal to the horizontal base member 72, as best illustrated in FIG. 8. The first segment 86 of each rotating stabilizer 78,80 is rotatingly secured to the second individual member 46 of each vertical frame member 34,36, at the second end 26 of the frame 16. The first end 90 of the second segment 88 of each rotating stabilizer 78,80 is rotatingly secured to the second individual member 46 near the second end 26 of the frame 16. The second end 92 of the second segment 88 of each rotating stabilizer 78,80 is welded or otherwise secured to the first segment 86 so that the second segment 88 is diagonal with respect to the first segment 86, as noted above.

Figure 7:
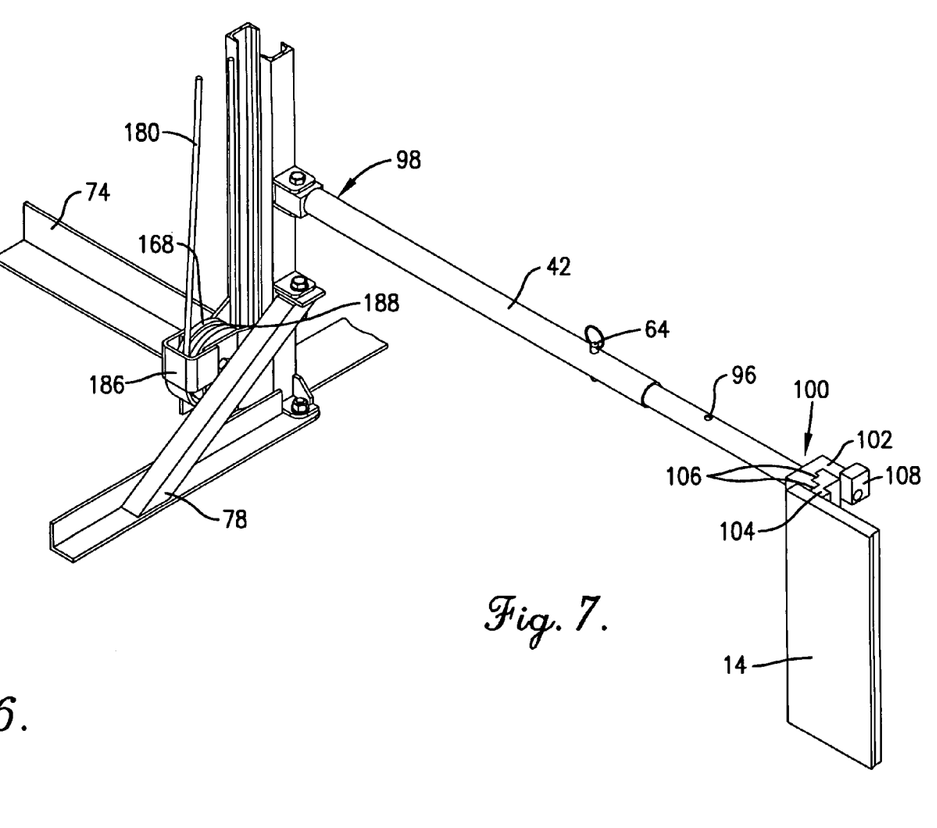
FIG. 7 is an isometric view of the second end of the frame, illustrating the securing arm secured to the flange of the storage cabinet.

In use, the first and second rotating stabilizers 78,80 are preferably in contact with the floor. They may be rotated approximately 180° to provide support and stabilization to the lift 10 while in use. For example, when assembling the lift 10, it is preferred that the rotating stabilizers 78,80 are rotated to a position approximately parallel to the stationary base members 74,76, as illustrated in FIG. 4. When installing or uninstalling the computer-related equipment 12, it is preferred that the rotating stabilizers 78,80 are rotated out to a position approximately perpendicular to the stationary base members 74,76, as illustrated in FIG. 7. When disassembling the lift 10 for storage, it is preferred, as noted above, to rotate the rotating stabilizers 78,80 in so that the length of each rotating stabilizer 78,80 is proximal to the horizontal base member 72, as illustrated in FIG. 8.

The four securing arms 42 are each preferably rotatingly secured to the frame 16 for increased portability of the lift 10, such that two of the arms 42 are positioned near the first end 24 of the frame 16, and similarly, two of the arms 42 are positioned near the second end 26 of the frame 16, as illustrated in FIG. 1. The securing arms 42 are preferably made of aluminum, but other suitable materials may be used, such as steel, other alloys, or composites. The securing arms 42 are preferably telescoping, such that each arm 42 may be extended or retracted to a plurality of lengths to accommodate the spacing of the lift 10 with respect to the storage cabinet 14 while assembling the lift 10 and installing or uninstalling the computer-related equipment 12. The preferred length of each securing arm 42 may be dependent on a depth of the computer-related equipment 12, a length of the storage cabinet 14 and computer-related equipment's slides 94 (see FIG. 1), or the space in which to position the lift 10 while installing or uninstalling the computer-related equipment 12. Each arm 42 is secured into position at a particular length using a locking pin 64, substantially similar to the locking pin 64 used with the hinges 52, inserted through a hole 96 in the arm 42, as illustrated in FIGS. 4, 7, and 8.

Each securing arm 42 has first and second ends 98,100. The first end 98 of each arm 42 is rotatingly secured to the frame 16. The second end 100 of each arm 42 is provided with a clamp 102 for securing the arm 42, and thus the portable lift 10, to the storage cabinet 14. To secure the lift 10 to the storage cabinet 14, the clamp 102 is removably secured to a flange 104 of the storage cabinet 14, as illustrated in FIGS. 4 and 7. Once the arms 42 are secured to the storage cabinet 14, the lift 10 is stable and can support the weight of the computer-related equipment 12. As can be appreciated, sufficient and safe support of the equipment 12 is extremely important, as the equipment 12 is costly and can often weigh in excess of 136 kg (approximately 300 lbs).

The clamp 102 as illustrated in FIG. 8 is designed to clamp to a COMPAQ brand storage cabinet 14 (see also FIG. 7). The clamp 102 includes two steps 106 which mate with the flange 104 of the COMPAQ cabinet 14, as illustrated in FIGS. 7 and 8. A rotating locking side 108 can be rotated to an up position, as illustrated in FIG. 7, when positioning the clamp 102 on the flange 104 of the COMPAQ cabinet 14, and then rotated back down to a locking position to secure the clamp 102 to the COMPAQ storage cabinet 14.

Figures 12, 13:
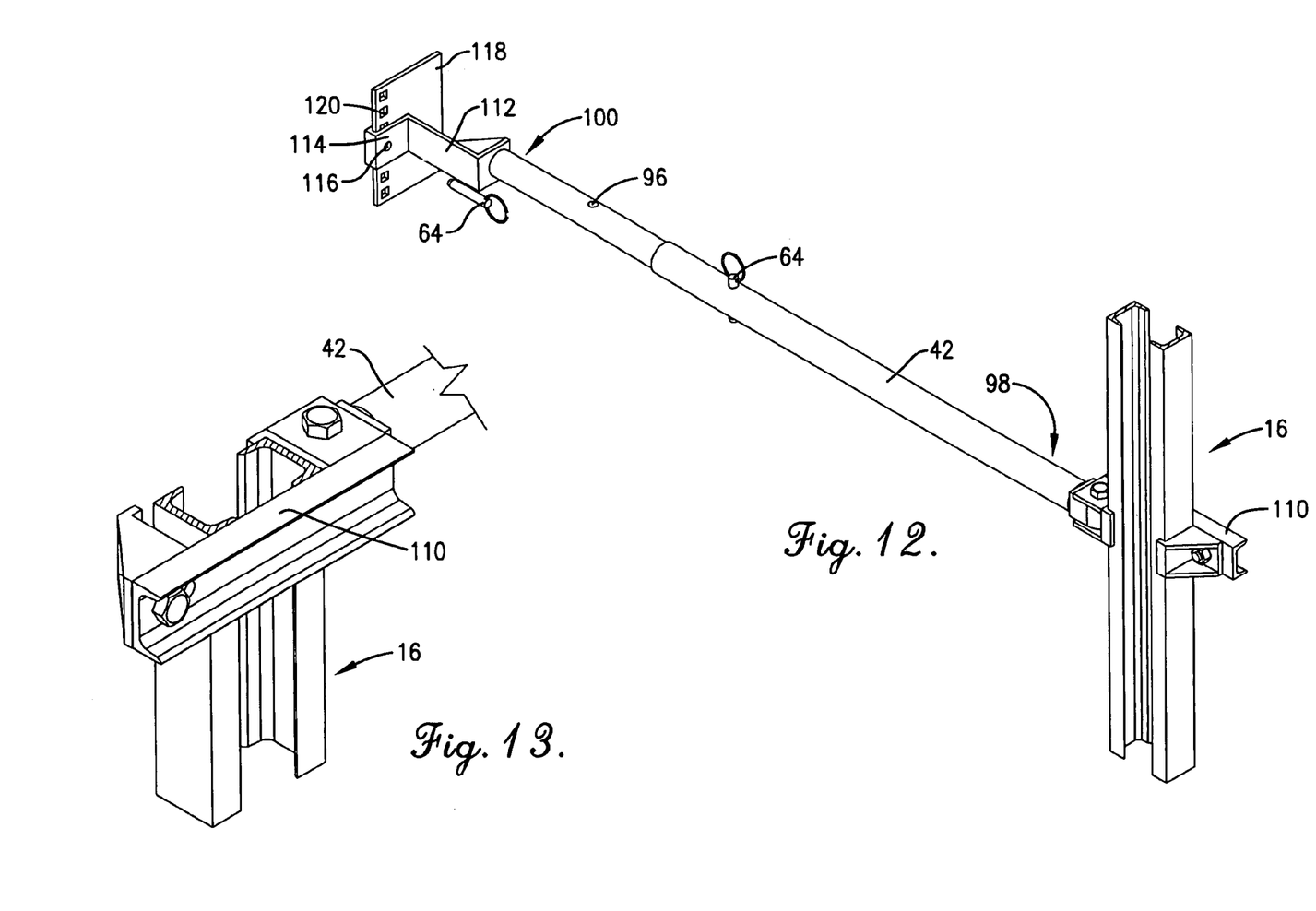
FIG. 12 is an isometric view of an alternative embodiment of the securing arm secured to a flange of a storage cabinet having a plurality of equally-spaced openings, particularly illustrating an alternative embodiment of the clamp secured to the securing arm.
FIG. 13 is an isometric view of the alternative embodiment of the clamp, particularly illustrating a rear of the clamp and its operability to securely clamp onto the frame of the portable lift.

Alternatively, the portable lift 10 may include additional securing arms 42 designed to be secured to any brand storage cabinet 14, as illustrated in FIG. 12. The first end 98 of an alternative embodiment of the securing arm 42, illustrated in FIG. 12, is provided with a standard clamp 110 having an adjustable width. The clamp 110 is secured to the frame 16 by adjusting the width of the clamp 110 to fit securely against the frame 16, as illustrated in FIG. 13. The second end 100 of the securing arm 42 is provided with a generally L-shaped member 112, wherein a leg 114 of the member 112 includes an opening 116. Storage cabinets 14 for storing computer-related equipment 12, other than the COMPAQ brand, commonly have a flange 118 provided with a plurality of equally-spaced openings 120. To secure the securing arm 42, and thus the portable lift 10, to the storage cabinet 14, the opening 116 in the leg 114 of the L-shaped member 112 is aligned with one of the openings 120 in the flange 118 of the storage cabinet 14. A locking pin 64, substantially similar to the locking pin 64 used to secure the securing arm's 42 length, is then inserted through the opening 116 in the leg 114 and the opening 120 in the flange 118 to secure the securing arm 42 to the cabinet 14. In this alternative, the securing arm 42 need not be rotatingly secured to the frame 16. A benefit of having the alternative embodiment of the securing arm 42 is that the portable lift 10 may be secured to any brand storage cabinet 14.

The trolley 18 preferably includes first and second support brackets 122,124 and a tray 126. The first and second support brackets 122,124 are preferably triangularly-shaped, as illustrated in FIG. 4. Each support bracket 122,124 preferably includes two U-shaped guides 128 formed on either end of each bracket 122,124, the purpose of which will be described below. A center bar 130 is preferably formed generally center or middle of each bracket 122,124. Two keyhole openings 132 are formed on the center bar 130, the purpose of which will also be described below. The support brackets 122,124 are preferably made of steel, but other suitable materials may be used, such as aluminum, other alloys, or composites.

Figure 3:
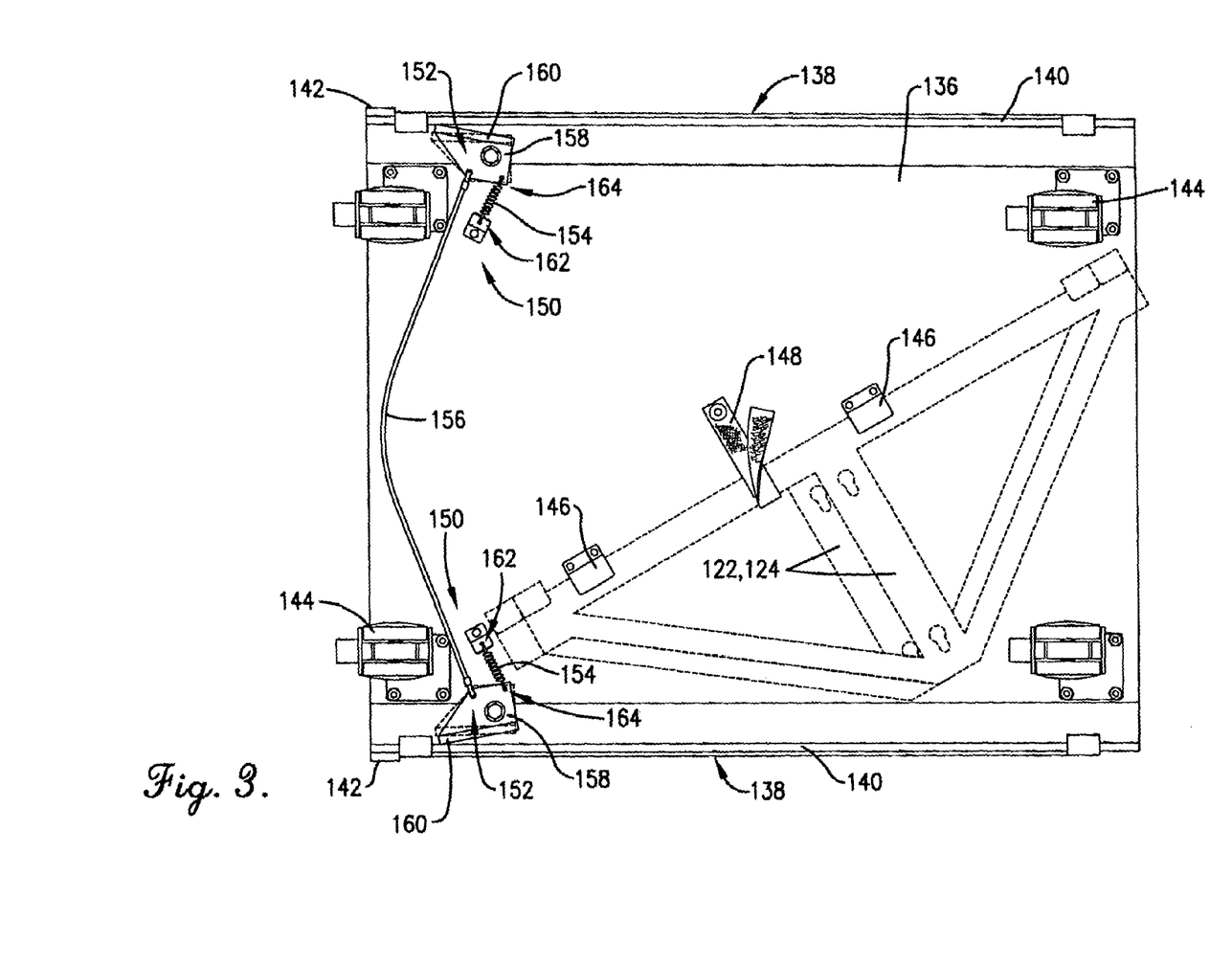
FIG. 3 is a rear elevational view of the tray taken through line 3—3 of FIG. 1, illustrating two support brackets in broken line to demonstrate storage of the support brackets and showing a plurality of castors and a release mechanism for releasing the tray from the trolley.

The tray 126 is preferably generally rectangularly-shaped and is made of aluminum, but other suitable materials may be used. The tray 126 is designed to be secured within the support brackets 122,124 as described below. The tray 126 has a topside 134, an underside 136, and two edges 138, as illustrated in FIGS. 3 and 4. Each edge 138 is preferably provided with a rim 140, wherein each rim 140 extends generally perpendicular from the respective edge 138. A stop 142, comprising a piece of metal, plastic, or other suitable material, is secured to an end of each rim 140, the purpose of which will be described below.

The tray 126 preferably includes four castors 144 secured to the underside 136 of the tray 126, although fewer or more castors 144 may be used. Each castor 144 is preferably designed to roll on a multiplicity of surfaces, such as carpet, wood, tile, or linoleum. The tray 126 also includes two protruding holders 146, positioned on the underside 136 of the tray 126, for holding or storing the support brackets 122,124 when the portable lift 10 is disassembled. The support brackets 122,124 slide within the protruding holders 146 and are further secured to the underside 136 of the tray by a piece of VELCRO 148, which wraps around the support brackets 122,124.

The tray 126 further includes a spring-loaded release assembly 150, positioned on the underside 136 of the tray 126, for removing the tray 126 from the support brackets 122,124. The spring-loaded release assembly 150 preferably includes two pivoting latches 152, two tension springs 154, and a portion of rope 156 positioned between the latches 152, as illustrated in FIG. 3. Each latch 152 has first and second legs 158,160 formed generally perpendicular to each other. The first leg 158 of each latch 152 is generally trapezoidally-shaped, although other shapes may be used, such as triangular, rectangular, or spherical. The first leg 158 is positioned generally parallel to and pivotable secured to the underside 136 of the tray 126. The second leg 160 (only a vertical cross-section of the second leg is shown in FIG. 3) is generally triangularly-shaped, although other shapes may be used, such as trapezoidal, rectangular, or spherical. The second leg 160 of each latch 152 is operable to partially contact the respective rim 140 of the tray 126 when the tray 126 is secured within the support brackets 122,124.

Each tension spring 154 has first and second ends 162, 164. The first end 162 of each spring 154 is secured to the underside 136 of the tray 126, and the second end 164 of each spring 154 is secured to the respective first leg 158 of the respective latch 152. When the spring 154 is at rest, the latch 152 is preferably and importantly positioned such that the second leg 160 partially contacts, and is angled with respect to, the rim 140.

The rope 156 is secured between the latches 152 and preferably has a length to allow for a small amount of "give" and thus, not be tautly secured. The rope 156 may include a grasping surface, such as a plastic ring (not shown) wrapped around a center of the rope 156, wherein the plastic ring includes finger guides (not shown) to facilitate placement of a user's fingers when grasping and pulling the rope 156.

The winch assembly 20 of the portable lift 10 is operable to vertically position the trolley 18 within the frame 16. The winch assembly 20 preferably includes a winch 166, first, second, and third pulleys 168,170,172, first and second guide rollers 174,176, a cable connector 178, and first, second, and third cable portions 180,182,184. The winch 166 is preferably any standard winch 166 operable to support a load in excess of 136 kg (approximately 300 lbs). The winch 166 is preferably driven by a hand-turned crank and includes a drum (not shown) around which the first cable portion 180 is wound, as illustrated in FIG. 1 and as described in more detail below.

The first pulley 168 is preferably positioned at the second end 26 of the frame 16, as illustrated in FIGS. 7 and 8. The first pulley 168 is rotatably secured within a first housing 186, and the first housing 186 is secured, preferably by welding or other suitable method, to the first vertical frame member 34. The first pulley 168 preferably includes a first internal channel 188, the purpose of which is described below.

The second pulley 170 is preferably positioned at the first end 24 of the frame 16 at a corner where the two individual members 44,46 of the first vertical frame member 34 intersect the first and second parallel members 68,70 of the horizontal frame member 38, as illustrated in FIG. 9. Similar to the first pulley 168, the second pulley 170 is preferably rotatably secured to the frame 16. The second pulley 170 includes second and third internal channels 190,192, as best illustrated in FIG. 9. A first pulley cover 194, as illustrated in FIG. 9, partially surrounds the second pulley 170, the purpose of which is described below.

The third pulley 172 is preferably positioned at the first end 24 of the frame 16 near a corner where the two individual members 44,46 of the second vertical frame member 36 intersect the first and second parallel members 68,70 of the horizontal frame member 38. Similar to the second pulley 170, the third pulley 172 is also preferably rotatably secured to the frame 16. A second pulley cover 196 partially surrounds the third pulley 172, the purpose of which is described below. The third pulley 172 preferably includes a fourth internal channel 198, as best illustrated in FIG. 9.

The first and second guide rollers 174,176 each preferably have first and second faces 200,202, as illustrated in FIGS. 4 and 10. Two rollers 204 are preferably rotatably mounted to the first face 200 of each guide roller 174,176, such that each guide roller 174,176 is operable to roll within the open channel 48 formed by the two individual members 44,46 of each vertical frame member 34,36. Thus, the first guide roller 174 rolls along and within the first vertical frame member 34, and the second guide roller 176 rolls along and within the second vertical frame member 36. More or less rollers 204 may be used, depending on a desired weight and stability of the lift 10. Each guide roller 174,176 is preferably made of aluminum, although other suitable materials may be used, such as steel.

The second face 202 of each guide roller 174,176 is preferably provided with two pressed pins 206, as illustrated in FIG. 4. The support brackets 122,124 are secured to the guide rollers 174,176, and thus the frame 16, by mounting the two keyhole-shaped openings 132 of the support brackets 122,124 on the two pressed pins 206 of the guide rollers 174,176. Due to the stabilizing and balanced structure of the support brackets 122,124 and tray 126, the support brackets 122,124 mounted on the pressed pins 206 are sufficient to support the weight of the computer-related equipment 12.

The cable connector 178 preferably has first and second ends 208,210 and an outer face 212, is generally cylindrically-shaped, and is hollowed. Each end 208,210 is preferably tapered, such that the first end 208 is provided with first and second openings 214,216, and the second end 210 is provided with a third opening 218, as illustrated in FIGS. 6 and 10. The cable connector 178 is approximately 11.4 centimeters (approximately 4.5 inches) in length, although the length may range between 3.8 centimeters (approximately 1.5 inches) and 51 centimeters (approximately 20 inches). The cable connector 178 is preferably made of heavy steel. The positioning and purpose of the cable connector 178 will be described below.

The first, second, and third cable portions 180,182,184 are preferably made of heavy steel, with the first cable portion 180 having a diameter of approximately ³⁄₁₆ inch, and the second and third cable portions 182,184 having a diameter of approximately ⅛ inch. Other sized cable portions 180, 182,184 may be used to the extent the cable portions 180,182,184 are rated to support the weight of the trolley 18 and computer-related equipment 12.

To guide the cable portions 180,182,184 along the frame 16 and to prevent the cable portions 180,182,184 from becoming disengaged from the winch assembly 20, the winch assembly 20 also includes first and second rolling drums 220,222 and first, second, and third ring extensions 224,226,228. The first rolling drum 220 is preferably positioned proximal to the winch 166 and is rotatably mounted within a second housing 230, as illustrated in FIG. 2. The second rolling drum 222 is preferably positioned on the first vertical frame member 34 and is rotatably mounted in a third housing 232. The first and second rolling drums 220,222 orient and guide the cable portions 180,182,184 and hold the cable portions 180,182,184 taut when the lift 10 is assembled.

The first ring extension 224 is preferably positioned on the first vertical frame member 34 and proximal to the second rolling drum 222, as illustrated in FIG. 6. The second and third ring extensions 226,228 are preferably positioned on the first vertical frame member 34 near location A, where the first and second portions 28,30 of the frame 16 meet, as illustrated in FIG. 2. Each ring extension 224,226,228 preferably extends from the first vertical frame member 34 and is welded or otherwise secured to the first vertical frame member 34. Each ring extension 224,226,228 preferably includes a generally circular opening 234 sized to accommodate passage of the cable connector 178 and the cable portions 180,182,184 through the opening 234 without interference and without grinding of the cable connector 178 and cable portions 180,182,184 against the ring extensions 224, 226,228, as best illustrated in FIG. 6.

As noted above, the first cable portion 180 is secured to the winch 166 and winds around the drum (not shown) of the winch 166, as illustrated in FIG. 1. The first cable portion 180 then rolls along the first rolling drum 220 and downwards towards the second end 26 of the frame 16, as illustrated in FIG. 2. The first cable portion 180 is then guided through the first ring extension 224 and along the second rolling drum 222, both of which are illustrated in FIG. 6. In addition to guiding the cable portions 180,182,184 and keeping the cable portions 180,182,184 taut, the first and second rolling drums 220,222 minimize the wear and tear on the respective cable portions 180,182,184 since the cable portions 180,182,184 roll along the drums 220,222.

After winding around the second rolling drum 222, the first cable portion 180 is positioned to wind around and guide within the first internal channel 188 of the first pulley 168. The first cable portion 180 then proceeds upwards towards the first end 24 of the frame 16, where it is secured within the third opening 218 of the cable connector 178 at the cable connector's second end 210, as illustrated in FIGS. 6 and 10. The first cable portion 180 is secured to the cable connector 178 using a steel ball 236, which is secured to an end of the first cable portion 180 and is sufficiently large in diameter so as to not pass through the third opening 218 in the cable connector 178, as illustrated in FIG. 10.

The second and third cable portions 182,184 are secured to the cable connector 178, with the second cable portion 182 being secured through the first opening 214, and the third cable portion 184 being secured through the second opening 216, as illustrated in FIG. 6. An end of each of the second and third cable portions 182,184 (only the second cable portion 182 is shown) is secured within a swage block 238, as illustrated in FIG. 10. The swage block 238 is preferably made of aluminum, although other suitable materials may be used, such as steel. The swage block 238 is preferably generally cylindrically-shaped and includes at least two grooves 240. The swage block 238 is of a sufficiently large diameter that the block 238 cannot pass through the first or second openings 214,216 of the cable connector 178, thus securing the second and third cable portions 182,184 to the cable connector 178.

Once secured to the cable connector 178, the second cable portion 182 winds around and is guided within the second internal channel 190 of the second pulley 170 and proceeds downwards towards the second end 26 of the frame 16. The second cable portion 182 is then secured within the first guide roller 174 positioned within the open channel 48 formed by the two individual members 44,46 of the first vertical frame member 34.

Similarly, once secured to the cable connector 178, the third cable portion 184 winds around and is guided within the third internal channel 192 of the second pulley 170, proceeds along a length of the horizontal frame member 38, winds around and is guided within the fourth internal channel 198 of the third pulley 172, and proceeds downwards towards the second end 26 of the frame 16 and along the second vertical frame member 36. The third cable portion 184 is then secured to the second guide roller 176 positioned within the open channel 48 formed by the two individual members 44,46 of the second vertical frame member 36.

The cable connector 178 greatly facilitates operation of the present invention since only one cable, namely the first cable portion 180, must wind around the winch 166. Without use of the cable connector 178, the second and third cable portions 182,184 would be required to wind around the winch 166, and thus, might wind at differing rates, which would tilt the tray 126 being raised or lowered. However, with the use of the cable connector 178, only one cable need wind around the winch 166, thus preventing the tray 126 from tilting.

An especially unique and beneficial feature of the present invention is that it is portable and can be easily assembled and disassembled by one user. The portable lift 10 and accompanying carrying unit 22 preferably weigh approximately 40.8 kg (approximately 90 lbs), although the weight of the portable lift and carrying unit may range between 11.3 kg (approximately 25 lbs) and 68 kg (approximately 150 lbs), depending on the size of the lift 10 and the types of materials used. For example, the frame 16 of the invention as described above is made of steel. However, since aluminum is a suitable alternative and generally weighs less than steel, the portable lift 10 and carrying unit 22 may easily weigh less than 40.8 kg (approximately 90 lbs). This is beneficial in a work environment, since the Occupational Safety and Health Administration ("OSHA") limits the weight a person can be required to lift in a workplace.

The carrying unit 22 for the portable lift 10 is preferably made of aluminum, although other suitable materials may be used, such as plastic. The carrying unit 22 is sized to accommodate the portable lift 10 when disassembled, as illustrated in FIG. 14. The unit 22 has front and rear ends 242,244 and top and bottom ends 246,248. The unit 22 preferably includes two wheels 250 (only one wheel shown) positioned on the rear end 244 of the unit 22. A handle 252 extends from the top end 246 of the unit 22, as also illustrated in FIG. 14. Other alternative handles 252 may be used, such as a T-shaped handle or a U-shaped handle. Additionally, fewer or more wheels 250 may be used and/or placed in different locations on the unit 22, such as at the front end 242 of the unit 22. Alternatively, a plurality of castors (not shown) may be secured to the bottom end 248 of the unit 22 for rolling the unit 22 to a desired position.

To assemble the portable lift 10, a user removes the folded or collapsed lift 10 from the carrying unit 22, as illustrated in FIG. 14 The lift 10 is placed on a floor, with the horizontal base member 72 and stationary base members 74,76 contacting the floor. In this position, the third portion 32 of the frame 16 is standing upright, with the first portion 28 folded relative to the second portion 30, and the first and second portions 28,30 folded relative to the third portion 32. The user then unfolds the first and second portions 28,30 upward, inserting the locking pins 64 at each of the respective hinges 52 to secure the frame 16 in place. While assembling the lift 10, the user preferably has the first and second rotating stabilizers 78,70 rotated generally perpendicular to the horizontal base member 72. Once the lift 10 is assembled, and the computer-related equipment 12 is ready to be lifted by the trolley 18, the first and second rotating stabilizers 78,70 are preferably rotated outwards, such that the rotating stabilizers 78,70 are generally parallel to the horizontal base member 72, as best illustrated in FIG. 7 and as described above. In this position, the rotating stabilizers 78,80 stabilize lift 10 and prevent excessive lateral rocking of the lift 10 when moving the trolley 18 within the frame 16 and installing or uninstalling the computer-related equipment 12.

Due to the construction of the portable lift 10, and particularly the pulley covers 194,196 and ring extensions 224,226,228, the cable portions 180,182,184 of the winch assembly 20 do not become entangled or removed from their respective locations during disassembly of the lift 10 and while the lift 10 is folded into the carrying unit 22. Consequently, the ease and quickness with which a user of the lift 10 can assemble and disassemble the lift 10 is increased.

To secure the portable lift 10 to the storage cabinet 14, the user rotates the securing arms 42 outwards such that the arms 42 are generally perpendicular to the frame 16. The user then secures each arm 42 to the storage cabinet 14, using the telescoping ability of the arms 42 to account for the distance the lift 10 is from the storage cabinet 14, as illustrated in FIG. 1. The telescoping ability of the arms 42 prevents a user from having to move the lift 10 to an exact distance from the storage cabinet 14.

To load the computer-related equipment 12 into the storage cabinet 14, the user first secures the support brackets 122,124 to the frame 16, as illustrated in FIG. 4 and as described above. The user then winds the winch 166 to move the trolley 18 and corresponding support brackets 122,124 proximal to the floor. The computer-related equipment 12 is placed on the topside 134 of the tray 126. The tray 126 is then rolled into position, such that each rim 140 of the tray 126 aligns within the U-shaped guides 128 of the support brackets 122,124 and within the guide rollers 174,176, as illustrated in FIG. 5. As noted above, the weight of the tray 126 and the computer-related equipment 12 is supported by the support brackets 122,124 and guide rollers 174,176 and distributed throughout the length of the support brackets 122,124.

The user then winds the winch 166, which winds the first, second, and third cable portions 180,182,184 around the first, second, and third pulleys 168,170,172. Since the second and third cable portions 182,184 are secured to the guide rollers 174,176, the support brackets 122,124 are secured to the guide rollers 174,176, and the tray 126 is secured within the support brackets 122,124, the computer-related equipment 12 is vertically moved within the frame 16. Once at the correct height, the user simply slides the equipment 12 into the storage cabinet 14. As illustrated in FIG. 1 and briefly noted above, most computer-related equipment 12 and storage cabinets 14 are equipped with mating ball-bearing slides 94 for sliding the equipment 12 into and out of the storage cabinet 14.

Although the invention has been described with reference to the preferred embodiment illustrated in the attached drawing figures, it is noted that equivalents may be employed and substitutions made herein without departing from the scope of the invention as recited in the claims. For example, the portable lift 10 may be sized to accommodate varying weights of computer-related equipment 12 and heights of storage cabinets 14. Varying portable lifts 10 may be manufactured and rated to accommodate equipment 12 weighing, for example, no more than 45 kg (approximately 100 lbs), 136 kg (approximately 300 lbs), or 227 kg (approximately 500 lbs). Thus, varying sized frames 16, winches 166, cables 180,182,184, and pulleys 168,170,172 would be required.

Alternative positioning assemblies to vertically move the trolley 18 may be used, instead of the winch assembly 20. For example, hydraulic or pneumatic cylinders may be used to raise and lower the trolley 18. A further alternative may be to raise or lower the trolley 18 by electrical means instead of a hand-turned winch 166.

The topside 134 of the tray 126 may have a smooth surface to facilitate sliding the computer-related equipment 12 into the storage cabinet 14. The tray 126 may also include additional rims 140 positioned around the topside 134 of the tray 126 that may be raised or lowered to prevent the equipment 12 from sliding off the tray 126. Alternatively, the topside 134 of the tray 126 may include a gripping surface, such as a rubber mat, to prevent the equipment 12 from sliding. This may be beneficial when the equipment 12 is light and thus, tends to move around more on the tray 126.

The invention claimed is:

1. A lift for installing and uninstalling computer-related equipment into and from a storage cabinet, the lift comprising:
   a frame operable to be removably secured to the storage cabinet without damaging the cabinet, the frame including
      first and second ends,
      at least one hinge for folding the frame into at least two sections along a longitudinal axis of the frame to facilitate portability of the lift and for folding the frame into a carrying unit that can be transported by one user,
      first and second vertical frame members,
      a horizontal frame member positioned at the first end of the frame between the first and second vertical frame members,
      a base positioned at the second end of the frame, and
      four telescoping securing arms rotatably secured to the frame and operable to be removably secured to the storage cabinet for securement of the lift to the storage cabinet;
   a trolley operable to be removably mounted to the frame for supporting the computer-related equipment while the equipment is being installed and uninstalled in the cabinet, the trolley being operable to move generally vertically along the longitudinal axis of the frame, the trolley including a tray on which the computer-related equipment may rest, the tray being separable from the frame and including means for transporting the tray to a location remote from the frame while the computer-related equipment is resting on the tray; and
   a positioning assembly mounted to the frame and operable to vertically move the trolley within the frame.

2. The lift as claimed in claim 1, the trolley including first and second support brackets, and the tray adapted to be removably secured within the support brackets.

3. The lift as claimed in claim 2, the positioning assembly including
   a winch,
   first and second pulleys,
   a cable connector, and
   first and second cable portions secured to the cable connector, the first cable portion being secured to the winch and operable to wind around the first pulley, and the second cable portion being operable to wind around the second pulley, such that winding the winch moves the cable portions.

4. The lift as claimed in claim 3, wherein the positioning assembly further includes first and second guide rollers operable to roll along the first and second vertical fame members, respectively, wherein the first and second cable portions are secured to the first and second guide rollers, respectively.

5. The lift as claimed in claim 4, wherein the support brackets are adapted to be removably mounted to the guide rollers, such that the tray supported within the support brackets is operable to vertically move within the frame.

6. A portable lift for installing and uninstalling computer-related equipment into and from a storage cabinet, the portable lift comprising:
   a frame divisible along a longitudinal axis of the frame into at least first and second sections, such that the first section is operable to fold proximate to the second section to facilitate storage of the frame in a carrying unit for transportation by one user, the frame further operable to be removably secured to the storage cabinet without damaging the cabinet;
   a trolley for supporting the computer-related equipment, the trolley being operable to move vertically along the longitudinal axis of the frame, the trolley including
      a tray separable from the frame and operable to receive the computer-related equipment thereon at a location remote from the frame, the tray including means for transporting the tray from the remote location to the frame while having the computer-related equipment received on the tray, and
      a pair of support brackets on which the tray may rest while being moved vertically along the longitudinal axis of the frame, wherein the support brackets are removable from the frame to facilitate storage of the frame in the carrying unit; and a positioning assembly for vertically moving the trolley along the longitudinal axis of the frame, the positioning assembly including
at least one pulley, and
at least one cable portion trained over the pulley and configured for cooperating with the pulley for vertically moving the trolley within the frame.

7. The portable lift as claimed in claim 6, the positioning assembly further including a pair of guide rollers operable to roll along the frame, wherein the cable portion is secured to the guide rollers, and the support brackets are adapted to be removably mounted to the guide rollers, such that the tray is operable to vertically move within the frame.

8. The portable lift as claimed in claim 7, the frame further including four telescoping securing arms rotatably secured to the frame and operable to be removably secured with the storage cabinet for securement of the frame to the storage cabinet.

9. A lift for installing and uninstalling computer-related equipment into and from a storage cabinet, the lift comprising:
a frame;
a trolley for supporting the computer-related equipment; and
a positioning assembly for vertically moving the trolley within the frame, the positioning assembly including
a winch,
first, second, and third pulleys,
first, second, and third cable portions, wherein the first cable portion is trained over the first pulley, and the second cable portion is trained over the second pulley,
a cable connector, wherein the first and second cable portions are secured to the cable connector, the first cable portion is secured to the winch and is operable to wind around the first pulley, and the second cable portion is operable to wind around the second pulley, such that winding the winch moves the cable portions trained across the pulleys, which results in vertical movement of the trolley within the frame, and
first and second guide rollers, wherein the third cable portion is secured to the cable connector, wound around the second and third pulleys, and secured to the second guide roller.

10. The lift as claimed in claim 9, wherein the trolley further includes a tray on which the computer-related equipment is placed, and the trolley is removably secured to the guide rollers, such that winding the winch moves the cable portions and trolley vertically along the frame.

11. A lift for installing and uninstalling computer-related equipment into and from a storage cabinet, the lift comprising:
a frame having first and second ends and operable to be removably secured to the storage cabinet, the frame including
first and second vertical frame members,
a horizontal frame member positioned between the first and second vertical frame members at the first end of the frame,
a base positioned at the second end of the frame, and
at least one rotating and telescoping securing arm for securing the lift to the storage cabinet;
a trolley for supporting the computer-related equipment, the trolley including first and second support brackets, and a tray operable to be removably secured within the support brackets; and
a winch assembly for vertically positioning the trolley within the vertical frame members, the winch assembly including
a winch,
first, second, and third pulleys,
first and second guide rollers,
a cable connector, and
first, second, and third cable portions,
wherein a first end of the first cable portion is secured to the winch and a second end of the first cable portion is secured to the cable connector, the first cable portion being operable to wind around the first pulley,
wherein a first end of the second cable portion is secured to the cable connector and a second end of the second cable portion is secured to the first guide roller, the second cable portion being operable to wind around the second pulley and proceed along the first vertical frame member towards the second end of the frame, and
wherein a first end of the third cable portion is secured to the cable connector and a second end of the third cable portion is secured to the second guide roller, the third cable portion being operable to wind around second pulley, proceed along the horizontal frame member, wind around the third pulley and proceed along the second vertical frame member towards the second end of the frame.

* * * * *